United States Patent
Scheidel et al.

(10) Patent No.: US 9,523,388 B2
(45) Date of Patent: Dec. 20, 2016

(54) TWO-PART BEARING CAGE COMPRISING MULTIPLE LUGS WHICH FORM RETAINING CLAWS, PROJECT OUTWARDS FROM TWO ANNULAR BODIES INTO THE INTERIOR AND FORM FREE AREAS FOR LUBRICANT, AND BALL BEARING COMPRISING A BEARING CAGE OF THIS TYPE

(71) Applicant: Schaeffler Technologies AG & Co. KG, Herzogenaurach (DE)

(72) Inventors: Markus Scheidel, Hochstadt (DE); Reinhard Rehner, Nuremberg (DE); Thomas Fickert-Guenther, Hirschaid (DE); Andreas-Johann Bohr, Herzogenaurach (DE); Frank Zwanzger, Langenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/651,052

(22) PCT Filed: Nov. 7, 2013

(86) PCT No.: PCT/DE2013/200279
§ 371 (c)(1),
(2) Date: Jun. 10, 2015

(87) PCT Pub. No.: WO2014/090238
PCT Pub. Date: Jun. 19, 2014

(65) Prior Publication Data
US 2015/0377289 A1 Dec. 31, 2015

(30) Foreign Application Priority Data
Dec. 11, 2012 (DE) .................. 10 2012 222 799

(51) Int. Cl.
*F16C 33/38* (2006.01)
*F16C 19/06* (2006.01)
(Continued)

(52) U.S. Cl.
CPC ....... *F16C 33/3887* (2013.01); *F16C 33/3875* (2013.01); *F16C 33/6614* (2013.01); *F16C 33/7893* (2013.01); *F16C 19/06* (2013.01)

(58) Field of Classification Search
CPC ... F16C 19/06; F16C 33/3863; F16C 33/3875; F16C 33/3887; F16C 33/6614; F16C 33/7893; F16C 2226/74
(Continued)

(56) References Cited

U.S. PATENT DOCUMENTS

| 929,427 A | 7/1909 | Henzelmann |
| 1,051,911 A * | 2/1913 | Pondelick ............... F16C 25/08 384/526 |

(Continued)

FOREIGN PATENT DOCUMENTS

| AT | 265762 | 10/1968 |
| DE | 2210820 | 11/1972 |

(Continued)

*Primary Examiner* — Marcus Charles
(74) *Attorney, Agent, or Firm* — Volpe and Koenig, P.C.

(57) ABSTRACT

A two-part bearing cage for a ball bearing, including a first and a second annular body (1a, 1b) having a plurality of retaining claws (2) on their opposing end faces. The two annular bodies (1a, 1b) have an identical design and can be mounted opposite each other in such a way that cut-out sections (3) receive the retaining claws (2), thereby forming pockets (4) for receiving and guiding rolling bodies (5). The number of pockets (4) corresponds to the number of rolling bodies (5). According to the invention, the individual pockets (4) are arranged at a distance from one another in the circumferential direction in such a way that a free area (6) for receiving lubricant is formed between two pockets (4).

(Continued)

At least two pairs of retaining claws (2), at least two individual retaining claws (2), and the base of a pocket combine to form one pocket (4). The invention also relates to a ball bearing comprising a two-part bearing cage of this type.

10 Claims, 2 Drawing Sheets

(51) Int. Cl.
*F16C 33/66* (2006.01)
*F16C 33/78* (2006.01)

(58) Field of Classification Search
USPC .............. 384/470, 527–528, 530, 539, 523
See application file for complete search history.

(56) References Cited

U.S. PATENT DOCUMENTS

| | | | |
|---|---|---|---|
| 2,042,417 A * | 5/1936 | Wise | F16C 19/34 29/898.061 |
| 3,471,208 A * | 10/1969 | Vannest | F16C 33/3868 384/530 |
| 4,019,790 A | 4/1977 | Earsley et al. | |
| 4,626,113 A | 12/1986 | Forknall et al. | |
| 4,702,627 A | 10/1987 | Pollastro | |
| 6,302,252 B1 * | 10/2001 | Iga | F16D 41/067 192/41 A |
| 7,507,028 B2 * | 3/2009 | Markle | F16C 33/3875 384/470 |
| 2007/0230849 A1 * | 10/2007 | Naito | F16C 33/3875 384/530 |
| 2012/0060634 A1 | 3/2012 | Ueno | |

FOREIGN PATENT DOCUMENTS

| | | | | |
|---|---|---|---|---|
| DE | 3341970 A * | 6/1984 | | F16C 33/38 |
| DE | 3510467 | 10/1985 | | |
| DE | 3542055 | 6/1986 | | |
| DE | 3709673 A * | 10/1988 | | F16C 29/04 |
| DE | 69925976 | 5/2006 | | |
| DE | 102010007789 | 8/2011 | | |
| DE | WO 2011098357 A1 * | 8/2011 | | F16C 33/3875 |
| DE | 102012222799 A1 * | 6/2014 | | F16C 33/6614 |
| EP | 1010909 A1 * | 6/2000 | | F16C 33/41 |
| GB | 2049070 | 12/1980 | | |
| JP | 2001289249 | 10/2001 | | |
| JP | 2005083554 | 3/2005 | | |
| JP | 2007040383 | 2/2007 | | |
| JP | 2007040383 A * | 2/2007 | | F16C 33/38 |
| WO | 2012072110 | 6/2012 | | |

* cited by examiner

TWO-PART BEARING CAGE COMPRISING MULTIPLE LUGS WHICH FORM RETAINING CLAWS, PROJECT OUTWARDS FROM TWO ANNULAR BODIES INTO THE INTERIOR AND FORM FREE AREAS FOR LUBRICANT, AND BALL BEARING COMPRISING A BEARING CAGE OF THIS TYPE

CROSS REFERENCE TO RELATED APPLICATIONS

The following documents are incorporated herein by reference as if fully set forth: PCTDE2013200279, filed Nov. 7, 2013 and DE 102012222799.7, filed Dec. 11, 2012.

FIELD OF THE INVENTION

The invention relates to a two-part bearing cage for a ball bearing, comprising first and second annular bodies that have, on their end faces directed toward each other, a plurality of retaining claws, wherein the two annular bodies have identical constructions and can be mounted with respect to each other such that cut-outs hold the retaining claws, wherein pockets are created for holding and guiding the rolling bodies.

The invention also relates to a ball bearing comprising a two-part bearing cage of this type.

BACKGROUND

The publication DE 35 10 467 A1 discloses a ball bearing cage for radial ball bearings consisting of an annular body made from flexible material that has pockets for holding balls in a snap-in seating and guide pegs for guiding the balls in the pockets, when the annular body is inserted from the side into the bearing. A locking ring can be set on the guide pegs, in order to maintain equal chord intervals between the guide pegs and to limit deformation of the annular body. In this way, the annular body cannot be pushed out due to the effect of contact forces occurring between the balls and the cage during operation of the bearing.

From DE 10 2010 007 789 A1, a plastic cage for a rolling contact bearing is disclosed with pockets for holding rolling bodies, wherein this cage is divided in the axial direction into two identical cage parts and can be assembled by means of several snap-in connections. The snap-in connection is formed by an engaging pawl and an engaging groove, wherein at least one engaging pawl and one engaging groove are provided on each cage part that can each be engaged in an annular groove or engaging pawl of the other cage part, respectively. The snap-in connection is active in the radial direction.

The publication GB 2 049 070 A further discloses two identical cages that are mounted opposite each other and have retaining claws for the rolling bodies. However, the cages are offset with respect to angle so that the respective claws of the cage are not in contact. Each cage thus holds only half of the rolling body of the bearing.

In addition, the publication DE 699 25 976 T2, which is the closest to the subject matter of the invention, discloses a cage for a ball bearing that has an annular body provided with receptacles in the form of hemispherical domes. The receptacles are open on one side of the annular body and hold the balls. The other side of the annular body has a wall that forms a deflector. The number of receptacles is equal to the number of bearing balls. The receptacles for the balls are extended by at least one retaining claw and have recesses that permit the use of the cage in connection with a second, identical cage that is mounted in an opposing arrangement. Each end of the hemispherical dome that forms the receptacle has at least one claw. The claws of an identical receptacle are offset radially from each other with respect to the axis of the cage, wherein the receptacles for each claw have a recess. The recesses are arranged at the same radial height as the claw on the other end of the receptacle.

A disadvantage in the already previously cited publications is that after the assembly of the two cage halves by the compactly constructed bearing ring, there is only limited or no space for lubricant in the bearing. This has a considerable negative effect on the lubricating properties and reduces the service life of the bearing.

SUMMARY

Starting from the described disadvantages of the known prior art, the invention is therefore based on the objective of providing a two-part bearing cage with optimized lubricating properties and a ball bearing comprising a bearing cage of this type, in order to increase the service life of the ball bearing.

This objective is achieved starting with a two-part bearing cage according to the invention. Advantageous refinements of the invention come from the description and claims that follow.

According to the invention, the individual pockets are spaced apart from each other in the circumferential direction, so that a free space is formed between two pockets for holding lubricant, wherein at least two pairs of retaining claws and at least two individual retaining claws form, together with a pocket base, a pocket. Here, the pairs of retaining claws have, in comparison to the individual retaining claws, an undercut wrapping around the rolling body so that the two annular bodies are held together when assembled to form a bearing cage by a positive-fit connection. The undercut that wraps around the rolling body on the pairs of retaining claws realizes a snapping-in of the pairs of retaining claws on the rolling bodies, so that the bearing cage can be mounted in a simple way on a roller bearing. In this respect, the individual retaining claws have a construction that is axially straight or inclined after the greatest cross section of the rolling bodies, and thus have no undercut that wraps around the rolling body.

Advantageously, a pair of retaining claws with a cut-out arranged between the two retaining claws on an individual retaining claw with two cut-outs arranged adjacently follows alternately over the circumferential surface. In an assembly of the two annular bodies to form the bearing cage, the cut-outs hold the retaining claws. Here, the pairs of retaining claws have a complementary shape to the two cut-outs arranged radially next to the individual retaining claws. The axial support of the two annular bodies is realized by means of pairs of retaining claws. The individual retaining claws are held by the cut-outs between the two retaining claws of the pairs of retaining claws. The individual retaining claws do not completely fill up the cut-outs due to a lower height than the pairs of retaining claws. In this way, an opening is created between the individual retaining claws and the end face of the opposing annular body. Through the opening, all of the pockets and free spaces are connected to each other fluidly in the circumferential direction. The lubricant is thus located not only in the free spaces provided for this, in order to improve the lubricating properties of the ball bearing, but also circulates through the openings.

In addition, it is preferred that the retaining claws and the cut-outs are arranged symmetrically across the circumferential surface of the end faces turned toward each other in the two annular bodies. The symmetrical arrangement realizes continuous good lubricating properties across the entire extent. Furthermore, the production and assembly of the annular bodies are also improved.

The invention includes the technical teaching that the pairs of retaining claws have the same orientation across the entire circumferential surface of the two annular bodies. This is also an important feature that contributes to simple production and assembly.

According to one of the measures further improving the invention, it is provided that the individual retaining claws have the same orientation across the entire circumferential surface of the annular bodies, wherein this is opposite the orientation of the pairs of retaining claws. Through the opposite orientation of the individual retaining claws with respect to the pairs of retaining claws, the internal contour of the pockets is adapted to the rolling bodies. The retaining claws thus have a concave shape on the inner contour.

It is further provided that the two annular bodies have, on their end faces turned away from each other, a disk-shaped ring. The disk-shaped ring is advantageously constructed directly on the annular body, so that a latter attachment by welding or bonding is eliminated.

Advantageously, the two disk-shaped rings have a radially inner lip on an inner periphery and a radially outer lip on an outer periphery. The radially inward pointing lip arranged on the inner periphery forms, together with the inner ring of the ball bearing, a sealing labyrinth, while the radially outward pointing lip arranged on the outer periphery forms, together with the outer ring of the ball bearing, a sealing labyrinth. In this way, not only is the ball bearing protected against contamination from the surroundings, but also the lubricant is held within the bearing cage and thus on the running surfaces of the rolling bodies.

It is also preferred that the two annular bodies are made from a polymer material. Advantageously, the polymer material is a thermoplastic, in particular, polyamide. Advantageously, the polyamide is reinforced by glass fibers. The use of the polymer material is especially advantageous with respect to the production of the annular bodies. The production is preferably realized in accordance with the injection molding method. Furthermore, retaining claws consisting of a polymer material have a higher elasticity and better frictional values as metallic retaining claws.

According to one especially preferred embodiment, the individual retaining claws are formed wider in the circumferential direction than the pairs of retaining claws and therefore create a back-side contact in the circumferential direction if the two annular bodies are brought together at the end sides for forming the bearing cage. The back-side contacting of the individual retaining claws prevents twisting of the annular bodies relative to each other, so that jamming of the rolling bodies can be ruled out. Because the individual retaining claws are not supported across the entire back side, sufficient free space is guaranteed for holding lubricant.

BRIEF DESCRIPTION OF THE DRAWINGS

Additional measures improving the invention are shown in more detail below together with the description of a preferred embodiment of the invention with respect to the accompanying drawings. Shown are.

DETAILED DESCRIPTION OF THE PREFERRED EMBODIMENTS

Figure 1:
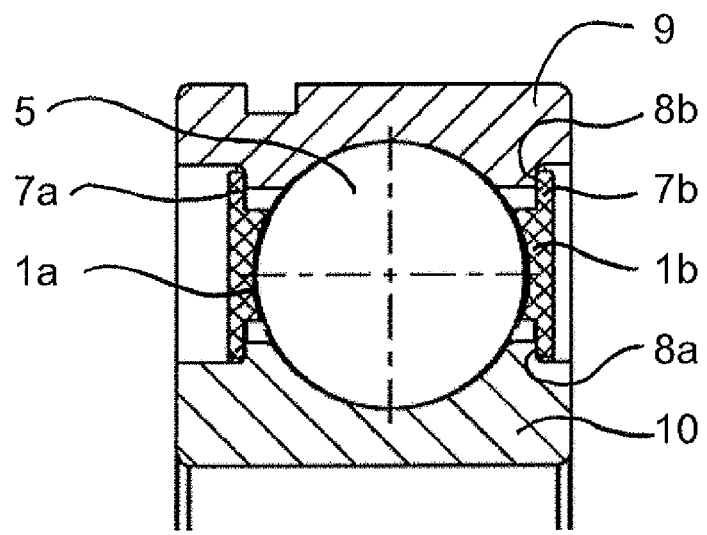
FIG. 1 a partial cross-sectional diagram of a ball bearing according to the invention, comprising a two-part bearing cage, FIG. 2 a perspective diagram of one of the two annular bodies of the two-part bearing cage according to the invention from FIG. 1, FIG. 3 a perspective diagram of the two-part bearing cage according to the invention from FIG. 1, FIG. 4 a perspective diagram of the two-part bearing cage according to the invention according to a preferred embodiment.

FIG. 1 shows a ball bearing, comprising an outer ring 9, an inner ring 10, and a plurality of rolling bodies 5 rolling between outer ring 9 and inner ring 10. The rolling bodies 5 are arranged at a distance to each other in the circumferential direction by a bearing cage constructed from a polymer material and comprising first and second annular bodies 1a and 1b. The two annular bodies 1a and 1b have, at their end faces facing away from each other, a disk-shaped ring 7a and 7b. The two disk-shaped rings 7a and 7b each have a radially inner lip 8a on an inner periphery and a radially outer lip 8b on an outer periphery. The radially inner lips 8a arranged on the inner periphery form, together with the inner ring 10 of the ball bearing, a sealing labyrinth, while the radially outer lips 8b arranged on the outer periphery form, together with the outer ring 9 of the ball bearing, a sealing labyrinth.

Figure 2:
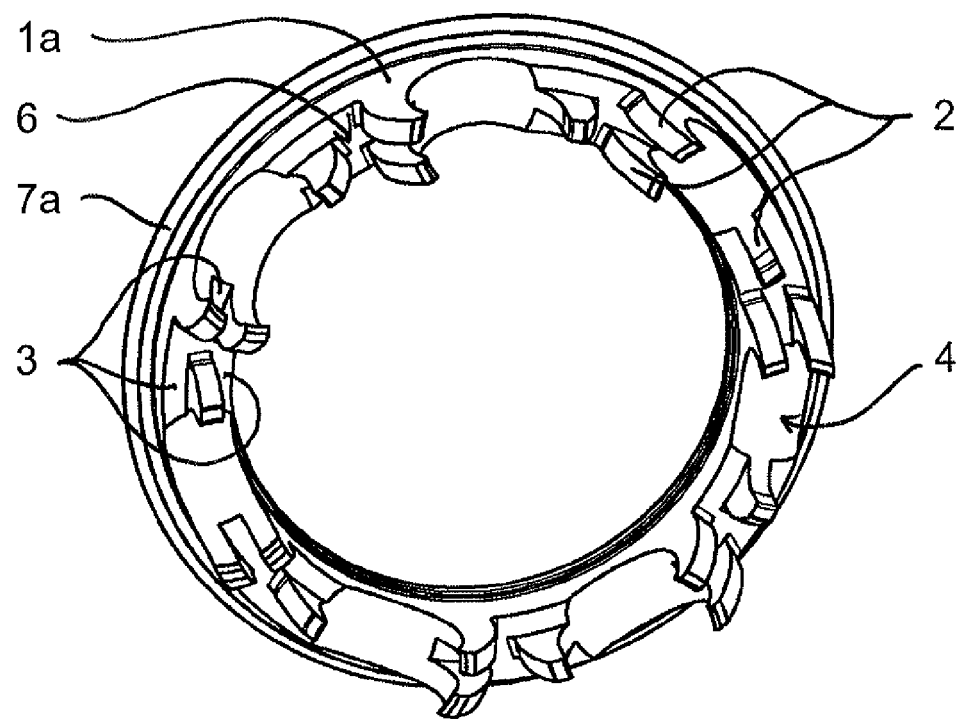

According to FIG. 2, the first annular body 1a, which is identical to the second annular body 1b, has, on an end face directed inward toward the rolling bodies 5, a plurality of retaining claws 2. In total there are seven pairs of retaining claws 2 set opposite seven individual retaining claws 2, so that a pair of retaining claws 2 and an individual retaining claw 2 form, together with a pocket base arranged in-between, a half pocket 4. Between the two retaining claws 2 of each pair of retaining claws 2 there is a cut-out 3. A cut-out 3 is arranged on both sides radially next to the individual retaining claw 2. The cut-outs 3 hold the retaining claws 2 of the second annular body 1b when the bearing cage is assembled. The pairs of retaining claws 2 have, in comparison with the individual retaining claws 2, an undercut that wraps around the rolling body.

Figure 3:
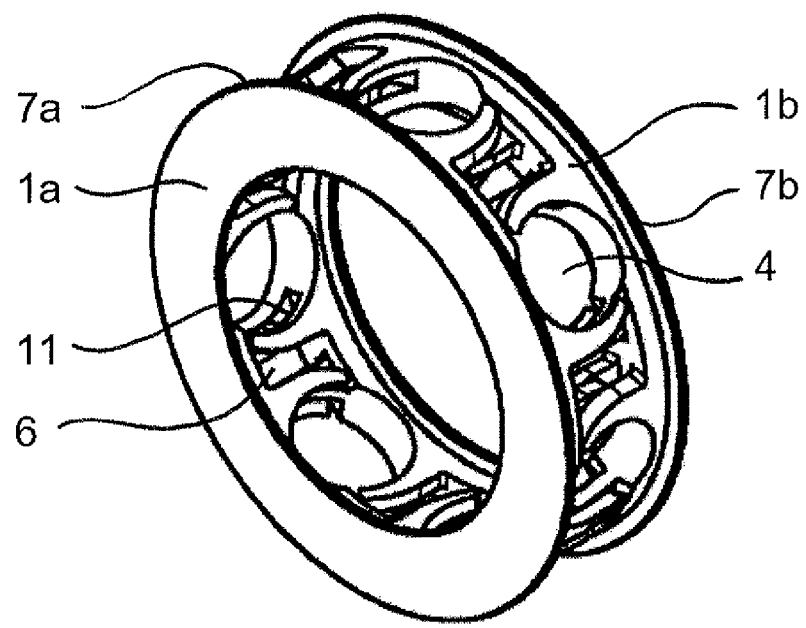

FIG. 3 shows the two annular bodies 1a and 1b in the assembled state. The bearing cage constructed in this way has a free space 6 between two pockets 4 for holding lubricant. Furthermore, due to a lower height of the individual retaining claws 2, openings 11 are created between the individual retaining claws 2 and the end face of the opposite annular body 1b. The pockets 4 and the free spaces 6 are connected to each other fluidly via the openings 11, so that circulation of the lubricant through the rolling bearing is made simpler.

Figure 4:
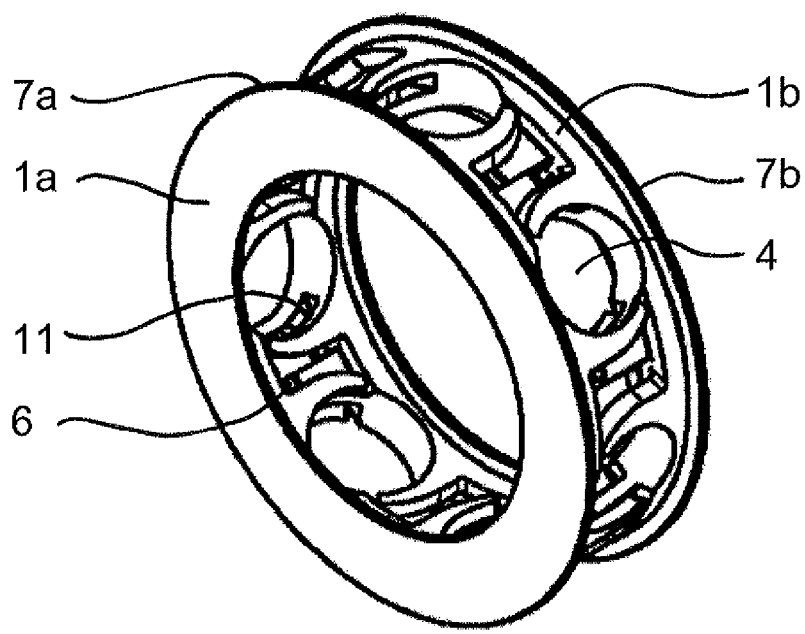

The embodiment shown in FIG. 4 has the advantage that the annular bodies 1a and 1b cannot rotate relative to each other. The individual retaining claws 2 have a wider construction, namely in the circumferential direction, than the pairs of retaining claws 2 and form a back-side contact for an end-side joining of the two annular bodies 1a and 1b in the circumferential direction. In this way, jamming of the rolling bodies 5 is reliably prevented.

The invention is not limited to the preferred embodiment described above. Instead, modifications hereto are also conceivable that are included in the scope of protection of the subsequent claims. For example, it is also possible, instead of the pair of retaining claws 2, which represents an arrangement of two retaining claws 2 separated from each other by a cut-out 3, to arrange three retaining claws 2 radially next to each other. Because two cut-outs 3 are arranged between the overall three retaining claws 2 in such an arrangement, instead of an individual retaining claw 2, a pair of retaining claws 2 is arranged opposite. The pocket 4 is thus formed by two pairs of retaining claws 2 and two triplets of retaining claws 2 together with the pocket base.

It is also to be noted that "comprising" does not exclude other elements or steps and "one" or "a" does not exclude a plurality. It should also be noted that features or steps that have been described with reference to one of the above embodiments can be used in combination with other features or steps of other embodiments described above. Reference symbols in the claims are not to be considered restrictions.

LIST OF REFERENCE NUMBERS

1 Annular body
2 Retaining claw
3 Cut-out
4 Pocket
5 Rolling body
6 Free space
7 Disk-shaped ring
8 Lip
9 Outer ring
10 Inner ring
11 Opening

The invention claimed is:

1. A two-part bearing cage for a ball bearing, comprising first and second annular bodies that have, on respective end faces thereof directed toward each other, a plurality of retaining claws, wherein the two annular bodies have identical constructions and are mountable opposite each other such that cut-outs hold the retaining claws, whereby pockets for holding and guiding rolling bodies therein are created, a number of the pockets corresponds to a number of the rolling bodies, the individual pockets are spaced apart from each other in a circumferential direction, so that, between two of the pockets, a free space is formed for holding lubricant, and at least two pairs of the retaining claws and at least two individual ones of the retaining claws form, together with a pocket base, a pocket.

2. The bearing cage according to claim 1, wherein a pair of the retaining claws with a cut-out arranged between the two retaining claws follows alternately over a circumferential surface an individual one of the retaining claws with two cut-outs arranged adjacently.

3. The bearing cage according to claim 1, wherein the retaining claws and the cut-outs are arranged symmetrically over a circumferential surface of the end faces directed toward each other in the two annular bodies.

4. The bearing cage according to claim 1, wherein the pairs of retaining claws have a same orientation over an entire circumferential surface of the two annular bodies.

5. The bearing cage according to claim 4, wherein the individual retaining claws have a same orientation over the entire circumferential surface of the annular body, that is set opposite the orientation of the pairs of retaining claws.

6. The bearing cage according to claim 1, wherein the two annular bodies have a disk-shaped ring on each of their end faces spaced apart from each other.

7. The bearing cage according to claim 6, wherein the two disk-shaped rings have a radially inner lip on an inner periphery and a radially outer lip on an outer periphery.

8. The bearing cage according to claim 1, wherein the two annular bodies are formed from a polymer material.

9. The bearing cage according to claim 1, wherein the individual retaining claws are wider in the circumferential direction than the pairs of retaining claws and thus create a back-side contact in the circumferential direction upon the two annular bodies being brought together at their end sides for forming the bearing cage.

10. A ball bearing, comprising an outer ring, an inner ring, and a plurality of rolling bodies that roll between the outer ring and inner ring and are arranged spaced equally apart from each other in the circumferential direction by a bearing cage according to claim 1.

* * * * *